UNITED STATES PATENT OFFICE.

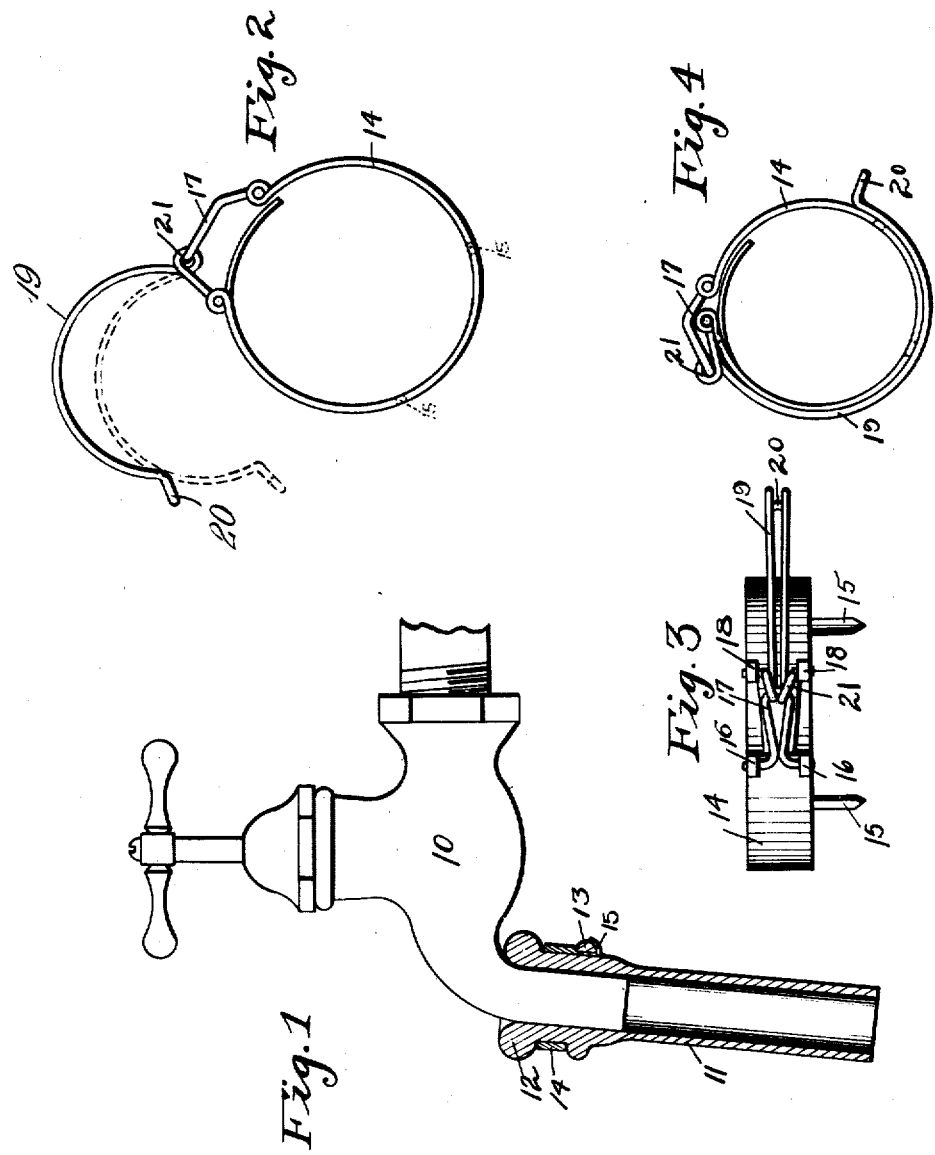

FRANK A. FERGUSON, OF WATERLOO, IOWA.

HOSE-FASTENER FOR WATER-COCKS.

1,012,345. Specification of Letters Patent. Patented Dec. 19, 1911.

Application filed September 10, 1909. Serial No. 517,026.

*To all whom it may concern:*

Be it known that I, FRANK A. FERGUSON, a citizen of the United States, residing at Waterloo, in the county of Blackhawk and State of Iowa, have invented a certain new and useful Hose-Fastener for Water-Cocks, of which the following is a specification.

The object of my invention is to provide a device of simple, durable, and inexpensive construction that may be readily, quickly, and easily applied to any ordinary water cock having a smooth exterior not provided with a screw thread, and to provide a device of this kind that may be readily, quickly and easily applied to a hose and to a water cock, and that when once applied will be firmly held in position on the water cock.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a side elevation of a water cock having thereon a device embodying my invention, which device is shown in longitudinal section. Fig. 2 shows an edge view of the clamping device forming part of my improvement, in an open position. Fig. 3 shows a side view of same, and Fig. 4 shows a view similar to Fig. 2, the clamping device being in a closed position.

Referring to the accompanying drawings, I have used the reference numeral 10 to indicate a water cock of ordinary construction having a discharge end provided with a smooth outer surface. My hose attaching device comprises a short, flexible tube 11 having an enlarged, annular rib 12 at its outer end, and an annular rim 13 extended around it spaced apart from the rib 12. The entire tube, including the rib 12 and the rim 13 is preferably formed complete of rubber and canvas or other material ordinarily used in making hose. The lower end of the tube 11 is of substantially the same size and shape as an ordinary piece of hose and a hose may be secured to the tube by any of the ordinary fastening devices now in common use for connecting two pieces of hose together.

The means for securing the tube 11 to the water cock comprises a sheet metal collar 14 designed to extend around the tube 11 between the parts 12 and 13. This collar is provided with two ends, one of which overlaps the other. Formed on one side of the collar are a number of integral lugs 15. These lugs are designed to be extended through the rib 13 and then curved upwardly and over said rib to permanently secure the collar 14 to the tube 11. On one end of the collar 14 are the lugs 16 in which is pivotally supported a link 17. Spaced apart from the other end of the collar are the lugs 18 in which are pivoted the ends of a lever 19. This lever is preferably formed of a single piece of wire detachable at its central portion and having its body portion substantially semi-circular in outline to fit against the exterior of the collar 14, as clearly shown in Fig. 4. This curved portion of the lever is preferably slightly greater than a half circle, and the lever is made of resilient material so that when the lever is placed in position in engagement with the collar, it will be yieldingly held in a locked position thereon. The end of the lever opposite from the pivoted end is preferably extended outwardly at 20 to form a handle, and, near the pivoted end of the lever 19, I have formed the loops 21 through which the link 17 is passed. These parts are so arranged that when the lever is in the position shown in Fig. 2 of the drawings, the diameter of the collar 14 will be at its maximum, and the tube may then be readily and easily slipped on a water cock. Then when the lever is moved to its closed position, as shown in Fig. 4, the link 17 will draw the end of the collar to which it is attached to position over the other end of the collar, and the collar will be firmly clamped on the tube to securely hold the tube to the water cock, and no fastening device is needed for the lever on account of its being extended around slightly more than half of the collar.

I claim as my invention:

1. A device of the character described, comprising a tube provided with an annular rib, and an annular rim parallel with said rib, a metal collar provided with projections penetrating said rim, said collar having its ends overlapped and being provided with two pairs of lugs on its outer surface, a link pivotally secured to one pair of said lugs, and a curved lever pivotally secured to the other pair of lugs and adapted to lie flat against the collar, and having a loop for the attachment of said link.

2. A device of the class described, comprising a flexible tube having an annular rib at one end, and an annular rim slightly spaced apart from said rib, a sheet metal collar with its ends in overlapping positions, lugs on one side of said collar extended through said annular rim and bent to position overlapping said rim, a link pivoted to one end of the collar, and a lever pivoted near the other end of the collar, said lever being formed of a single piece of spring wire and being provided with loops near its pivoted end to receive said link, and also being provided with a curved body portion comprising slightly more than a half circle and capable of lying flat against the collar, the end of said lever opposite from the pivoted end being extended outwardly to form a handle, substantially as and for the purposes stated.

3. A device of the class described, comprising a flexible tube having an annular rib thereon, a collar having its ends in overlapping positions, a lug extending laterally from said collar and penetrating said annular rib, a link pivoted to one end of the collar, and a resilient lever pivoted adjacent the opposite end of the collar and provided with a loop through which said link is pivoted.

Des Moines, Iowa, Aug. 23, 1909.

FRANK A. FERGUSON.

Witnesses:
E. A. RESOR,
J. H. HILDEBRAND.